US005116704A

United States Patent [19]

Kwon

[11] Patent Number: 5,116,704

[45] Date of Patent: May 26, 1992

[54] BARRIER RIB FORMING METHOD OF PDP

[75] Inventor: Ki-Duck Kwon, Seoul, Rep. of Korea

[73] Assignee: Samsung Electron Device Co., Ltd., Seoul, Rep. of Korea

[21] Appl. No.: 403,767

[22] Filed: Sep. 6, 1989

[30] Foreign Application Priority Data

Sep. 14, 1988 [KR] Rep. of Korea ........................ 11870

[51] Int. Cl.[5] ............................................ G03H 3/00

[52] U.S. Cl. ........................................ 430/3; 430/20; 430/320; 430/311; 430/325; 430/329; 430/330; 430/198; 313/495; 313/586; 445/24; 445/25; 65/60.2; 65/60.53; 427/54.1; 427/57; 427/229; 427/419.2

[58] Field of Search .................. 313/586, 493; 445/24, 445/25; 430/311, 3, 20, 320, 324, 325, 329, 330, 198; 65/60.2, 60.3, 60.5, 60.53; 427/54.1, 57, 229, 419.2, 108, 126.2, 126.3

*Primary Examiner*—Ellis P. Robinson
*Assistant Examiner*—J. Weddington
*Attorney, Agent, or Firm*—Mathews, Woodbridge & Collins

[57] ABSTRACT

A barrier rib forming method for a PDP including a process of forming an emulsion layer as a filmed deposition upon a glass substrate having transparent electrodes thereon. Exposing the film to ultraviolet rays to produce electrodes with a proper pattern of an emulsion layer thereon. Printing, drying and heating a glass paste deposited on said emulsion. Ultrasonically vibrating the glass substrate to remove the emulsion layer and glass paste from the glass substrate.

4 Claims, 2 Drawing Sheets

BARRIER RIB FORMING METHOD OF PDP

BACKGROUND OF THE INVENTION

The present invention relates to a barrier rib forming method for use in fabricating a PDP plasma display panel.

In general, a gas discharge display panel is a displaying element wherein an inert gas is intorduced and sealed between two glass substrates having separated electrodes on each glass substrate, and wherein numerals and letters and the like are displayed by utilizing a gas discharge produced by an applied voltage at the electrodes.

In such devices, a barrier rib is formed to define a pixel and to prevent cross-talk between neighboring cells as well as to maintain a constant gap from anode to cathode.

Japanese laid open patent Sho-58-150248 discloses a prior art gas discharge display panel as discribed above. In this Japanese patent, a conventional screen printing method was utilized in order to form the barrier rib. The conventional barrier rib forming method used in PDP fabrication including usual screen printing may be explained more in detail along with the process sequence shown in FIGS. 2(A)-2(F) as follows:

As shown in FIG. 2(A), after coating an ITO(Indium Tin Oxide), transparent material film 32 for to form a transparent electrode on the surface of the glass substrate 31, as shown in FIG. 2(B), photoresistor 33 is coated on the ITO film 32 by using a spin coater or the like and then dried. Thereafter the photoresistor 33 is exposed to ultraviolet rays by utilizing a mask of predetermined pattern and developed, as shown in FIG. 2(C).

In the next step, the exposed ITO film 32 is etched leaving the photoresistor 33 and the corresponding unexposed portion of the ITO film 32. Next, the photoresistor 33 is removed by a photoresistor stripping solution as shown in FIG. 2(D) and FIG. 2(E) leaving the ITO film 32 to form ITO electrodes 34.

The barrier rib 35 shown in FIG. 2(F) can be formed by a printing and drying process repeated 7 to 10 times with glass paste and a screen mask.

Using this method of forming the barrier ribs 35 by screen printing, a misalignment of the screen mask and the glass substrates can transform and distort the shape of the electrodes and the barrier ribs and particularly change their widths. These transformations, especially the encroachment of glass paste onto the electrode can degrade the discharge characteristics of a PDP. These are troublesome problems to be solved in the art of glass paste printing with a screen mask. For example, the structures of the screen mask should be transformed in accordance with the PDP cell's size.

SUMMARY OF THE INVENTION

It is an object of the present invention to provide a method of forming barrier ribs in which the barrier ribs are formed acurately at each predetermined position, without any screen mask. Furthermore, the process is simplified.

For this purpose, the present invention includes and consists of the following unit processes: the emulsion layer forming process wherein the deposition of an emulsion coated film is made on a glass substrate on which a transparent electrode is installed, the exposure process wherein ultraviolet rays are focused onto the emulsion in a predetermined pattern, the developing process wherein the exposed emulsion is developed with a developing solution, a printing, drying and firing process wherein glass paste forms barrier ribs on the glass substrate, and an ultrasonic vibrating process wherein the glass substrate is virbrated so as to eliminate the unnecessary emulsion layer and glass paste.

BRIEF DESCRIPTION OF THE DRAWINGS

Now, the present invention will become more readily apparent from the following explanation of preferred embodiments thereof shown in the accompanied drawings wherein.

DETAILED DESCRIPTION OF THE PREFERRED EMBODIMENT

Figure 1A:
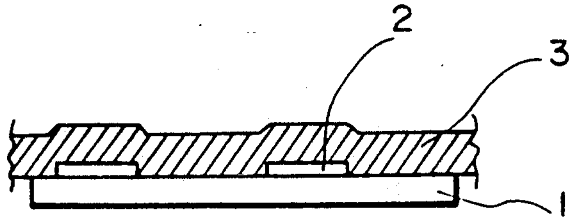
FIGS. 1(A) to 1(D) show cross sectional elevations illustrating a systematic order of the forming process of barrier ribs according to the present invention.

According to the present invention, the forming process of barrier ribs for a PDP as a whole can be executed on a glass substrate 1 on which transparent electrodes 2 are formed in a conventional manner. Next an emulsion layer 3, as shown in FIG. 1(A), is formed on the surface of the glass substrate 1.

Figure 1B:
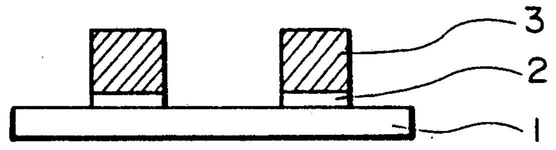

Then, emulsion layer 3 is exposed to the ultraviolet rays with wavelengths of 310 nm–460 nm for 60∼120 secs. so that, upon development of the emulsion, only a portion of the emulsion layer 3 remains intact on the transparent electrode 2, while the other portion of the emulsion layer 3 on the glass substrate 1 is completely eliminated, as shown in FIG. 1(B).

Figure 1C:
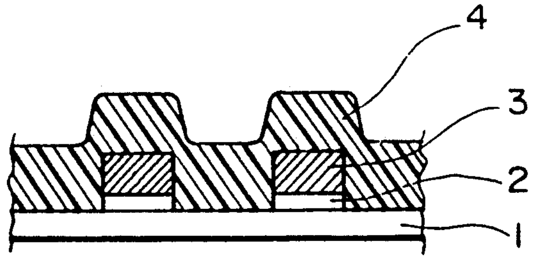

The glass substrate 1 with the electrode 2 covered by the emulsion 3 is printed with a glass paste 4 to form barrier ribs 5 by heat treating, as shown in FIG. 1(C).

This heating process results in removing the glass paste 4 this is adhered to the glass substrate 1. The heating process comprises drying or firing the paste 4 with heat of 120°–600° C. for an hour, as shown in FIG. 1(C).

With the glass paste 4 heated enough, there will be a stronger adhesion between the paste 4 and the glass substrate 1 than between the emulsion 3 and the electrode 2. Now, with proper vibration of panel 1 with ultrasonic waves exceeding 50 KHz for a certain duration of time, the emulsion 3 and the glass paste 4 are removed from the transparent electrode 2 and the emulsion layer 3, respectively.

Figure 1D:
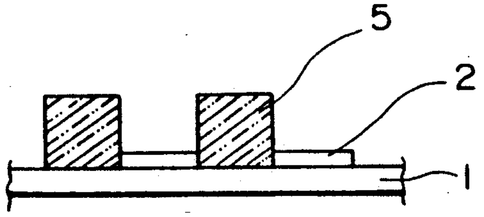
Figure 2A:
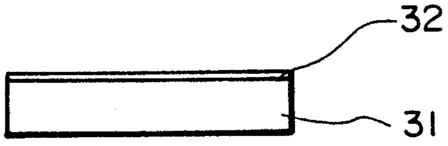
FIGS. 2(A) to 2(F) show cross sectional elevations illustrating a conventional process sequence of forming barrier ribs by a screen printing method.
Figure 2B:
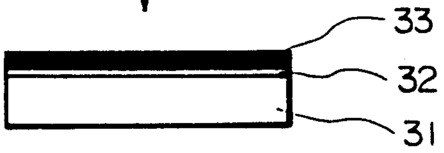
Figure 2C:
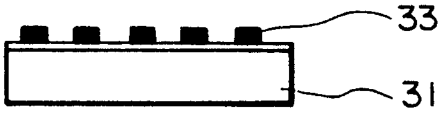
Figure 2D:
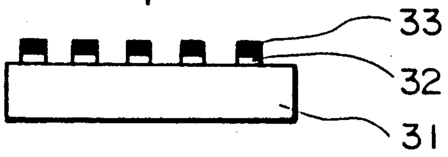
Figure 2E:
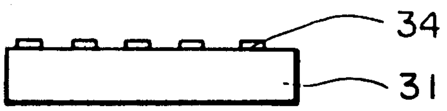
Figure 2F:
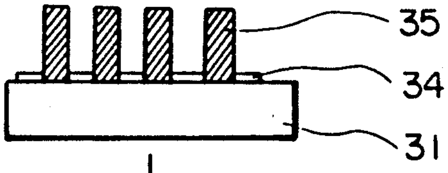

With the above unit processes, the barrier ribs 5 are formed on the glass substrate 1, as shown in FIG. 1(D), using the glass paste 4 according to the present invention, and without the need to use the known method employing a screen mask.

Furthermore, the present process solves prior art problems caused by the repeated printing with a screen mask, wherein a discordance of barrier rib tiers and variations of barrier rib widths inadvertently occur.

In conclusion, according to the present invention, a PDP barrier rib can be accurately and simply formed without the use of a screen, such problems as discordance and inaccuracy of the barrier ribs 5. Further in the present invention, the barrier ribs 5 can be made irrespectively of the size PDP cell, and the electrode as well can be formed along with the same invention.

It will be appreciated that the present invention is not restricted to the particular embodiment that has been described hereinbefore, and that variations and modifications may be made therein without departing from the spirit and scope of the invention as defined in the appended claims and equivalents thereof.

What is claimed is:

1. A barrier rib forming method for fabricating a plasma display panel comprising the steps of:

forming an emulsion layer by deposition of an emulsion on a glass substrate upon which transparent electrodes are formed;

exposing and developing said emulsion layer with ultraviolet rays to selectively form emulsion layers only on the electrodes;

printing a barrier rib material including glass particles over said glass substrate and over said electrodes upon which said emulsion layer remains;

heating said glass substrate printed with said barrier rib material; and, ultrasonically vibrating said glass substrate to selectively remove said emulsion layer and barrier rib material thereby leaving barrier ribs between said transparent electrodes.

2. The method of claim 1 wherein said emulsion layer is exposed to said ultraviolet rays with wavelengths of 310 nm–460 nm for a period of 60–120 seconds.

3. The method of claim 1 wherein said glass substrate printed with barrier rib material is heated to a temperature of 120° C.–600° C. for about an hour.

4. The method of claim 1 wherein said ultrasonically vibrating step employs ultrasonic vibrations exceeding 50 KHz.

* * * * *